US010301999B2

(12) United States Patent
De Vos et al.

(10) Patent No.: US 10,301,999 B2
(45) Date of Patent: May 28, 2019

(54) COMBINED HEAT EXCHANGING AND FLUID MIXING APPARATUS

(71) Applicant: Bosal Emission Control Systems NV, Lummen (BE)

(72) Inventors: Yves De Vos, Zemst (BE); Freddy Wollants, Aarschot (BE); Jean-Paul Hubert Janssens, Leopoldsburg (BE)

(73) Assignee: Bosal Emission Control Systems NV, Lummen (BE)

( * ) Notice: Subject to any disclaimer, the term of this patent is extended or adjusted under 35 U.S.C. 154(b) by 907 days.

(21) Appl. No.: 14/039,216

(22) Filed: Sep. 27, 2013

(65) Prior Publication Data

US 2014/0102667 A1 Apr. 17, 2014

(30) Foreign Application Priority Data

Oct. 11, 2012 (EP) .................................. 12188099

(51) Int. Cl.
*B01F 3/02* (2006.01)
*B01F 5/00* (2006.01)
(Continued)

(52) U.S. Cl.
CPC .............. *F01N 3/2892* (2013.01); *B01F 3/02* (2013.01); *B01F 5/0082* (2013.01);
(Continued)

(58) Field of Classification Search
CPC ........... F28D 2021/0052; F28D 9/0075; F28D 9/0093; F28D 9/0062; F28C 3/02;
(Continued)

(56) References Cited

U.S. PATENT DOCUMENTS 5,683,828 A * 11/1997 Spear .................... F28D 9/0075
29/623.5
6,200,536 B1 3/2001 Tonkovich et al.
(Continued)

FOREIGN PATENT DOCUMENTS

CN 1791461 A 6/2006
CN 101084061 A 12/2007
(Continued)

OTHER PUBLICATIONS

European Search Report for EP Application No. 12188099 dated Feb. 15, 2013 (7 pages).

*Primary Examiner* — Frantz F Jules
*Assistant Examiner* — Nelson J Nieves
(74) *Attorney, Agent, or Firm* — Merchant & Gould PC

(57) ABSTRACT

A combined heat exchanging and fluid mixing apparatus including a first conduit (44) for guiding a cool fluid through the first conduit and a second conduit (55) for guiding a hot gas through the second conduit. A heat conductive element (2) is arranged between the first conduit (44) and the second conduit (55) for transferring heat from the hot gas to the cool fluid. The apparatus further includes a third conduit (45) for guiding an exhaust fluid. The third conduit (45) comprises an exhaust fluid inlet (46) for introducing an exhaust fluid into the apparatus for mixing of the exhaust fluid with the hot gas and for a chemical reaction of the so formed exhaust fluid/hot gas mixture in the second conduit (55).

12 Claims, 4 Drawing Sheets

(51) Int. Cl.

| | | |
|---|---|---|
| *C01B 3/38* | (2006.01) | |
| *F01N 3/28* | (2006.01) | |
| *F28C 3/02* | (2006.01) | |
| *F28C 3/06* | (2006.01) | |
| *F28D 9/00* | (2006.01) | |
| *B01F 15/06* | (2006.01) | |
| *B01J 19/24* | (2006.01) | |
| *F28D 21/00* | (2006.01) | |
| *H01M 8/124* | (2016.01) | |
| *H01M 8/04007* | (2016.01) | |
| *H01M 8/04014* | (2016.01) | |

(52) U.S. Cl.
CPC ........... B01F 15/065 (2013.01); B01J 19/249 (2013.01); C01B 3/386 (2013.01); F28D 9/0062 (2013.01); H01M 8/04022 (2013.01); H01M 8/04074 (2013.01); *B01F 2015/061* (2013.01); *B01J 2219/247* (2013.01); *B01J 2219/2453* (2013.01); *B01J 2219/2462* (2013.01); *B01J 2219/2474* (2013.01); *B01J 2219/2479* (2013.01); *B01J 2219/2496* (2013.01); *C01B 2203/0261* (2013.01); *C01B 2203/066* (2013.01); *F28C 3/02* (2013.01); *F28C 3/06* (2013.01); *F28D 2021/0043* (2013.01); *F28D 2021/0052* (2013.01); *H01M 2008/1293* (2013.01)

(58) Field of Classification Search
CPC ........ B01J 2219/2461; B01J 2219/0085; B01J 2219/0096; B01J 19/249; B01J 2219/2496; B01J 2219/2474; B01J 2219/2479; B01J 2219/2453; B01J 2219/247; F01N 3/2892; H01M 8/04074; B01F 5/0082; B01F 3/02; B01F 2015/061
USPC .......................................... 165/139; 422/173
See application file for complete search history.

(56) References Cited

U.S. PATENT DOCUMENTS

| | | | |
|---|---|---|---|
| 6,510,894 B1 * | 1/2003 | Watton | B01J 9/0013 165/166 |
| 7,622,509 B2 * | 11/2009 | Tonkovich | B01F 3/0446 516/10 |
| 2002/0116916 A1 | 8/2002 | Hofmann et al. | |
| 2002/0117294 A1 * | 8/2002 | Filippi | B01J 8/0285 165/170 |
| 2004/0156763 A1 * | 8/2004 | Wood | B01F 5/0453 422/600 |
| 2005/0133457 A1 * | 6/2005 | Tonkovich | B01F 5/0475 210/739 |
| 2005/0163701 A1 * | 7/2005 | Tonkovich | B01J 19/0093 423/584 |
| 2006/0102519 A1 | 5/2006 | Tonkovich et al. | |
| 2006/0234095 A1 * | 10/2006 | Kong | B01J 19/249 48/197 R |
| 2007/0053809 A1 | 3/2007 | Brenner et al. | |
| 2007/0264170 A1 * | 11/2007 | Barthe | B01F 5/0603 422/130 |
| 2008/0020247 A1 | 1/2008 | Valensa et al. | |
| 2010/0068366 A1 * | 3/2010 | Tonkovich | B01F 3/0446 426/541 |
| 2011/0198289 A1 * | 8/2011 | Jonsson | F28D 9/0093 210/650 |

FOREIGN PATENT DOCUMENTS

| | | |
|---|---|---|
| DE | 10318061 A1 | 10/2001 |
| EP | 2384810 A1 | 11/2011 |
| FR | 2921415 A1 | 3/2009 |
| FR | 2924751 A3 | 6/2009 |
| GB | 2452249 | 3/2009 |
| JP | 2006-523522 A | 10/2006 |
| JP | 2008-520412 A | 6/2008 |

* cited by examiner

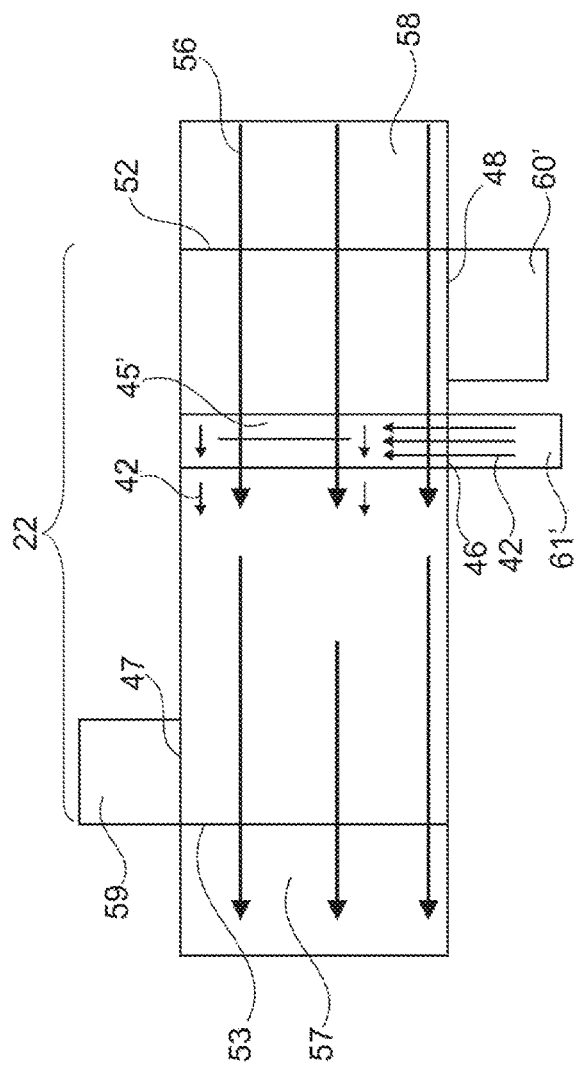
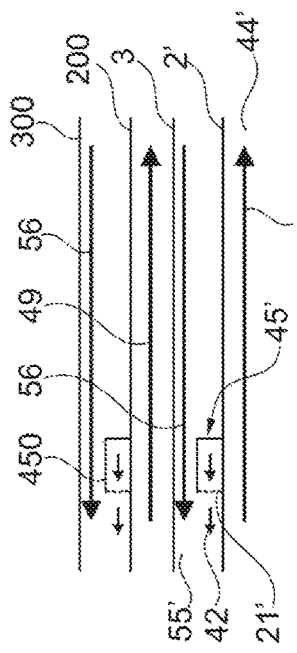

COMBINED HEAT EXCHANGING AND FLUID MIXING APPARATUS

CROSS-REFERENCE TO RELATED APPLICATION

This application claims the priority benefit of European Patent Application No. 12188099, filed on Oct. 11, 2012, which is hereby incorporated herein by reference.

TECHNICAL FIELD

The invention relates to the field of combined heat exchanging and fluid mixing apparatuses.

BACKGROUND

Fluid mixers are well known for example in the field of exhaust systems of motor vehicles. To enable a catalytic reaction of exhaust gas in a catalytic converter, a reducing agent, typically ammonia or urea, is mixed with the exhaust gas. For example in US 2002116916, upstream of a catalytic converter, grids are arranged next to an injection device for injecting the reducing agent. The grids provide an even distribution of the exhaust gas/reducing agent mixture. While fluid mixers and catalytic converters in exhaust systems are primarily used to remove noxious components, such as nitrogen oxides from the exhaust gas, catalytic reactions of exhaust gases may also be used to use up remaining fuel left in the exhaust gas. If reaction heat produced in this process is used, energy efficiency of a system may be enhanced.

Fuel cells are known as energy converters with high efficiency. In fuel cells, for example hydrocarbon fuels are directly converted into electrical energy and heat. In order to enhance an overall efficiency of an energy system the heat produced in the fuel cell may further be used for heating. Especially fuel cells operating at high temperatures, such as solid oxide fuel cells (SOFC), are suitable candidates for application in combined power generation and heat recovery devices. In general, a heat exchanger is arranged downstream of the fuel cell heating up a cool fluid for further use. For operation, SOFCs need a preheated oxidizing gas, especially air. This gas may be preheated in the heat exchanger before it is introduced into the SOFC. Furthermore, if a fuel introduced into the fuel cell is not completely used up such a depleted fuel leaving the fuel cell still contains fuel. The depleted fuel may now be mixed in a fluid mixer with the hot air leaving the SOFC for oxidizing the depleted fuel/hot air mixture. The mixture is then guided into the heat exchanger. The heat from the hot air as well as the reaction heat from the oxidizing reaction is used in the heat exchanger. Unfortunately, such systems include several individual components that require space and have high production costs, for example a separate fluid mixer and a separate heat exchanger. Another example consists of a separate burner and a separate heat exchanger, whereas the depleted fuel is mixed and oxidized in the said separate burner, which is placed upstream of the separate heat exchanger.

SUMMARY

Therefore, there is provided a heat exchanging and fluid mixing apparatus that takes into account disadvantages of the state of the art. Especially, there is provided a combined heat exchanging and fluid mixing apparatus that is weight and space saving and allows for reduced production costs.

The combined heat exchanging and fluid mixing apparatus according to the present invention comprises:
- a first conduit for guiding a cool fluid through the first conduit, the first conduit comprising a cool fluid inlet and a cool fluid outlet;
- a second conduit for guiding a hot gas through the second conduit, the second conduit comprising a hot gas inlet and a hot gas outlet;
- a heat conductive element arranged between the first conduit and the second conduit for transferring heat from the hot gas to the cool fluid, the heat conductive element having a length defining a maximum longitudinal extension for a heat exchanging process in the apparatus; further comprising
- a third conduit for guiding an exhaust fluid, the third conduit comprising an exhaust fluid inlet for introducing the exhaust fluid into the apparatus for mixing of the exhaust fluid with the hot gas and for a chemical reaction of the so formed exhaust fluid/hot gas mixture in the second conduit, wherein the third conduit is provided with more than one openings for introducing the exhaust fluid from the third conduit into the second conduit, wherein the more than one openings for introducing the exhaust fluid into the second conduit are arranged within the maximum longitudinal extension for a heat exchanging process in the apparatus, and wherein the more than one openings are arranged substantially at a same longitudinal position with respect to the second conduit.

A first conduit for guiding a cool fluid and a second conduit for guiding a hot fluid separated by a heat conductive element are arranged for a heat exchanging process from the hot gas to the cool fluid. Thereby, the length of the heat conductive element defines a maximum longitudinal extension, where a heat exchanging process may take place in the apparatus. Such a maximum longitudinal extension may effectively be used for a heat exchange from the hot gas to the cool fluid if the first and the second conduits are arranged along the whole length of the heat conductive element.

By providing a third conduit with an exhaust fluid inlet at one end thereof for introducing an exhaust fluid into the apparatus and into the second conduit, fluid mixing is integrated into a heat exchanger. By arranging more than one openings in the third conduit for introducing the exhaust fluid from the third conduit into the second conduit within the maximum longitudinal extension for a heat exchanging process in the apparatus, the exhaust fluid is introduced into the second conduit, at the earliest in a region inside the apparatus, where heat exchanging might take place. A mixing of exhaust fluid and hot gas starts at the same time or later, respectively further downstream (downstream with respect to the hot gas inlet and the flow of the hot gas in the second conduit) than the heat exchanging process from the hot gas to the cool fluid starts. To start the mixing for example when some heat has already been transferred from the hot gas to the cool fluid, may be favorable if the temperatures of the hot gas are very high at the hot gas inlet and rapid chemical reaction, for example oxidation of the exhaust fluid, and especially excess heat generation by an exothermic chemical reaction, such as for example an oxidation process, shall be prevented or reduced. By additionally arranging the more than one openings at substantially a same longitudinal position with respect to the second conduit, a further controlled chemical reaction and further controlled heat exchange may be performed in the apparatus according to the invention. If more than one openings are arranged at substantially a same longitudinal position of the second conduit, each fluid injected into the second conduit initially encounters the same hot gas environment. In addition, if the openings are arranged substantially at a same longitudinal position, also further reaction conditions may be unified for the injected fluid. For example, a time when the injected fluid reaches a catalytically active section in the second conduit or a time the injected fluid mixed with the hot gas encounters the effect of the cooling by the cool fluid of the first conduit may substantially be the same for fluid injected through different openings. By a catalytically active element a chemical reaction may be triggered to occur or start at a specific longitudinal position or region in the second conduit. By these measures, a first conduit comprising a cooling fluid may be arranged and the temperature of the cooling fluid may be adapted such that the chemical reaction and heat production in the second conduit is kept at a maximum or at a desired level. Substantially a same longitudinal position of the openings with respect to the second channel generally corresponds to a substantially same length or distance measured from an inlet of the second channel. However, in second conduits having one or more bends, a same longitudinal position essentially corresponds to a line, which is perpendicular to lateral conduit walls or to the flow direction in the second conduit.

If openings are arranged at different longitudinal positions in the second conduit it might occur that the fluid or mixture injected at a more upstream position already reacts before this fluid or mixture passes the more downstream holes, and before it reaches a catalytically active section in the second conduit. It may also occur that is reacts before it encounters the effect of the cooling by the cool fluid of the first conduit. If the reaction is exothermal, then excessive heat is produced and such an overheated injected fluid or mixture reacts with fluid injected at a more downstream position. This may lead to for example the burning of an injected exhaust fluid, which may damage the apparatus up to its destruction. With the arrangement of the openings as described it may be accomplished that combustion of an injected exhaust fluid/hot gas mixture only occurs in a cooled area of the apparatus.

By combining fluid mixing and heat exchanging, no separate components such as an individual fluid mixer arranged upstream of a heat exchanger are required. This reduces production and manufacturing costs, since no separate devices have to be manufactured and assembled. In addition, both processes—the heat exchanging and the fluid mixing—are combined in one apparatus. Therefore, also one housing only is required, which may, for example, be a steel envelope. This further reduces material costs and weight and in addition space may be saved, especially also since no connecting tubes are needed between individual components that are combined in the apparatus according to the invention.

The terms 'hot gas' and 'cool fluid' are herein used to describe a gas and a fluid—which fluid may be a gas, a liquid or a mixture thereof—that allow for a heat transfer from the hot gas to the cool fluid in a heat exchanger. The temperature of the cool fluid is lower than that of the hot gas. While there are basically no limitations as to a temperature difference between or a temperature range of the hot gas and the cool fluid, in some preferred embodiments, the temperature of the 'hot gas' at the hot gas inlet is in a range between 500 and 1000 degrees Celsius, for example around 800 degrees Celsius. In some preferred embodiments the temperature of the cool fluid at the cool fluid inlet is ambient temperature and a few hundred degrees Celsius, for example 700 degrees Celsius, at the cool fluid outlet.

An exhaust fluid may be a gas, a liquid or a gas-liquid-mixture. Mixing may be supported by the design of the exhaust fluid inlet or the more than one openings. For example the openings may act as nozzles, or mixing elements may be provided in the second conduit, for example grids, deflection elements or other obstacles causing turbulences in the flow of exhaust fluid and hot gas. An exhaust fluid is for example a depleted fuel from a fuel cell or an exhaust gas of an engine of a motor vehicle.

In preferred embodiments, a chemical reaction is an oxidation of the exhaust fluid, for example oxidation of a fuel. It may be, for example, a catalytic partial oxidation process (CPOX) of an exhaust fluid. Also CPOX is an exothermic chemical reaction. Therein, a fuel-air mixture is partially combusted, so that a gas rich in hydrogen is formed. This example for a chemical reaction that may occur in the apparatus according to the invention can for example be used to generate hydrogen for the working of a fuel cell in a single device. Other examples of chemical reactions are reforming processes of fuels, preferably of hydrocarbons. These chemical reactions are mentioned by way of example only. Further chemical reactions may depend on the content of the exhaust fluid as well as of the composition of the hot gas.

The energy required for starting and upkeeping a chemical reaction, especially an oxidation reaction of the exhaust fluid in the hot gas may be delivered by the hot gas only. Heat gained by the oxidation process or by another exothermic process further supports the oxidation process or the other chemical reaction taking place in the second conduit. Reaction heat may also heat up the hot gas, which is then—together with the hot gas—used in the heat exchanging process to heat up the cool fluid in the first conduit The term "arranged within the maximum longitudinal extension for a heat exchanging process in the apparatus" is not limited to a feature, for example to the more than one openings being arranged in the heat conductive element itself. The term rather describes a region in the apparatus, which region is in one dimension (or length) limited by the length of the heat conductive element. A location of a feature being "arranged within the maximum longitudinal extension" is therefore not arranged in an area outside (only with respect of the longitudinal direction) of the two longitudinal ends of the heat conductive element but within this region, for example parallel to the heat conductive element.

The more than one openings may be arranged in the heat conductive element, for example constructed as holes in a heat conductive plate, or parallel to the heat conductive element, for example arranged in a wall of a separate conduit guiding the exhaust fluid, which wall is not (necessarily) part of the heat conductive element. Preferably, the more than one openings are arranged downstream of the hot gas inlet. In preferred embodiments of the apparatus according to the invention, a plurality of openings is arranged along a length of the third conduit. For example, the plurality of openings may be arranged across a width or part of the width of the apparatus, such as the width or part of the width of the heat conductive plate.

The provision of more than one or a plurality of openings in the third conduit supports a mixing of the exhaust fluid passing through said plurality of openings: the exhaust fluid is guided into the hot gas at several locations. By additionally arranging the plurality of openings along the length of the third conduit, the exhaust fluid is guided into the hot gas at locations arranged along the length of the third conduit, which may be the width or part of the width of the apparatus, for example the width or part of the width of a heat conductive element or heat conductive plate or an entire width of a second conduit. For example, one row of holes of a size of about 1 mm may be arranged evenly over preferably an entire width of the second conduit. For example, one row of ten or twenty holes may be arranged at a same longitudinal position with respect to the second conduit.

According to an aspect of the apparatus according to the invention, the exhaust fluid inlet is arranged within the maximum longitudinal extension for a heat exchanging process in the apparatus. By this, not only the more than one openings but also the exhaust fluid inlet is arranged within the maximum longitudinal extension. The exhaust fluid inlet is favorably arranged parallel to the heat conductive element, for example at one end of the maximum longitudinal extension close to the hot gas inlet or versus the center of the maximum longitudinal extension or between the one end and the center. Thus, the exhaust fluid may be introduced into the apparatus at a position, where a heat transfer from the hot gas may already have started. This may be advantageous, in that the exhaust fluid may already have been heated up through the heat conductive element, in that a heat transfer to the cool fluid has already cooled down the hot gas and rapid oxidation or other exothermic chemical reaction of exhaust gas is prevented or minimized, in that the apparatus may be constructed in a compact manner, or by a combination of the aforementioned advantages.

The exhaust fluid is led into the apparatus at the exhaust fluid inlet and is guided in the third conduit to the more than one openings of the third conduit. The more than one openings may be arranged downstream of the hot gas inlet such that an exhaust fluid is directly introduced into hot gas and a mixing of exhaust fluid and hot gas occurs immediately upon introduction of the exhaust fluid into the second conduit. The flow of the hot gas carries the exhaust fluid along the flow direction of the hot gas in the second conduit.

In an aspect of the apparatus according to the invention, the third conduit is arranged in a direction perpendicular to a direction of the first or second conduit. With a perpendicular arrangement of the third conduit to either the first conduit or the second conduit or both a space saving arrangement of the third conduit in or next to a first or second conduit may be achieved. The third conduit may be arranged in the apparatus without or without noticeably shortening the length of the first or second conduit, respectively. In addition, a perpendicular arrangement allows for the provision of a plurality of openings extending across a width or part of the width of the apparatus and for the introduction of exhaust fluid into the hot gas along a whole width or part of the width of the second conduit, thereby supporting the mixing of exhaust fluid and hot gas. If third conduit and second conduit are arranged perpendicular to each other, a line of openings arranged along the length of the third conduit is at the same time arranged at a same longitudinal position of the second conduit. By such an arrangement, manufacturing of the individual elements of the apparatus according to the invention is facilitated.

According to an aspect of the apparatus according to the invention, the first conduit and the third conduit are arranged on a same side of the heat conductive element and the more than one openings for the passing of the exhaust fluid from the third conduit into the second conduit is arranged in the heat conductive element. By this arrangement, the cool fluid and the exhaust fluid are guided on a same side of the heat conductive element in the respective first and third conduits. Separate conduits for the cool fluid and the exhaust fluid can be realized by simple constructional means. In addition, the exhaust fluid may be introduced into the apparatus on the 'cool' side of the heat exchanger, preventing or limiting a chemical reaction, especially an exothermic chemical reaction such as for example oxidation before mixing of the exhaust fluid with the hot gas. By passing the exhaust fluid through more than one openings in the heat conductive element, the second conduit may be devoid of any obstructions. Due to the low density of the hot gas such obstructions in the second conduit might lead to a pressure drop over the second conduit.

Between the first conduit and the third conduit a fluid-tight separation element may be arranged for a fluid-tight separation of the first conduit and the third conduit. The first and third conduits are preferably arranged adjacent to each other and separated only by the fluid-tight separation element such that no fluid is exchanged from the first to the third conduit or vice versa. A separation element may be a spacer, for example in the form of a bar. Such a spacer may also define a dimension of the conduits, for example the height or thickness of the conduits.

According to another aspect of the apparatus according to the invention, the second conduit and the third conduit are arranged on a same side of the heat conductive element. Such an arrangement provides flexibility in the location of the more than one openings, where exhaust fluid enters the second conduit and actually mixes with the hot gas. For example, by arranging the third conduit more or less downstream of the hot gas inlet, for example adjacent the hot gas inlet or near half the length of the second conduit, a heat transfer and a reaction process may be optimized. If the third conduit is arranged further downstream of the hot gas inlet, the temperature of the hot gas has already cooled down. Thereby, a temperature for an exothermic chemical reaction may be held in a desired range. Also, the temperature of the hot gas at the hot gas inlet may be higher without causing excess chemical reactions already at the exhaust fluid inlet or at the more than one openings.

In addition, by arranging the third conduit and the second conduit on the same side of the heat conductive element, a first conduit for guiding the cool fluid may be extended. It may especially be extended to essentially a complete length of an apparatus, such that for example the whole length of the heat conductive element may be used for the heat exchanging process.

According to a further aspect of the apparatus according to the invention, the heat conductive element is a heat conductive plate arranged between a first and a second side plate. The heat conductive plate and the first and second side plates are arranged at a distance to each other forming a first gap between the first side plate and the heat conductive plate and forming a second gap between the heat conductive plate and the second side plate.

Plate heat exchangers are very effective due to their large surface areas useable for heat transfer. The manufacture of plate arrangements is convenient and may easily be extended to multiple-stacks. In addition, by providing two conduits on one side of the heat exchanging plate and one conduit on the opposite side of the heat exchanging plate, no further plates for conduits for an additional or separate cooling/heating or for a separate exhaust gas flow is required. This simplifies a manufacturing and make the apparatus according to the invention very compact.

In one embodiment according to this aspect the first gap is separated by the fluid-tight separation element into the first conduit and the third conduit. The second conduit is formed by the second gap and the more than one openings are arranged in the heat conductive plate. In the first gap being separated by the fluid-tight separation element, one part the gap forms the first conduit and another part of the gap forms the third conduit. In order for the exhaust fluid to pass from one side of the heat conductive plate to the other side of the heat conductive plate into the hot gas in the second conduit, the more than one openings are arranged in the heat conductive plate. In this arrangement the second gap forms the second conduit. Therein the hot gas may flow, essentially undisturbed, from the hot gas inlet to the hot gas outlet.

A third conduit may also be integrated into a first conduit. By this, a first conduit may extend over the length or part of the length of the heat conductive element.

In another embodiment according to this aspect the first conduit is formed by the first gap and the second conduit is formed by the second gap, while the third conduit is arranged in the second conduit. Integrating the third conduit into the second conduit allows providing a second conduit having a same length than without the presence of a third conduit in the second conduit, which length favorably corresponds to the length of the heat conductive plate. Hot gas then flows past the third conduit, which may cause turbulences and support a mixing of exhaust fluid released from the third conduit with the hot gas in the second conduit.

According to a further aspect of the apparatus according to the invention, the second conduit comprises a catalytically active element for a further chemical reaction such as an oxidation of the exhaust fluid/hot gas mixture.

To further support the chemical reaction such as an oxidation process of the exhaust fluid/hot gas mixture—or in case the temperature of the hot gas is not sufficient for a chemical reaction or to completely react the exhaust fluid—, a catalytically active element may be arranged in the second conduit. Such a catalytically active element may be arranged in a limited area of the second conduit and may be arranged downstream of the exhaust fluid inlet and especially downstream of the more than one openings. A catalytically active element is preferably arranged such, for example in a middle portion of the second conduit, so as to make use of reaction heat in the heat exchanging process. The term 'middle portion' preferably defines a region of the second conduit, which region extends over about 50% of the total length of the second conduit and which is arranged around mid-length of the second conduit. However, a catalytically active element may also be arranged as far upstream as for example to correspond to the position of the first conduit or to substantially directly correspond to the injection position for the exhaust gas.

A catalytically active element may be a catalytically active coating of a section of a wall of the second conduit. A coating does not or not remarkably enhance the resistance of a fluid flow in the second conduit. In addition, a coating may be applied to a conduit wall before assembly of the apparatus.

According to an aspect of the apparatus according to the invention, the cool fluid inlet and the hot gas outlet are arranged at one end portion of the apparatus and the cool fluid outlet, the hot gas inlet, the exhaust fluid inlet and the more than one openings are arranged at an opposite end portion of the apparatus. An end portion of the apparatus may especially be a top portion of the apparatus and an opposite end portion of the apparatus may be a bottom portion of the apparatus.

By arranging inlets and outlets for the cool fluid and the hot gas on opposite end portions of the apparatus, the two fluids of the heat exchanging process are guided through the apparatus in a counter-flow direction. This is a favorable flow direction in heat exchangers for a maximal heat transfer from the hot gas to the cool fluid. In addition, arranging inlets and outlets of conduits on opposite end portions, a maximal extension of the apparatus (at maximum the whole length of the heat conductive element) may be used for the heat exchanging process. By arranging the exhaust fluid inlet and the more than one openings on the same end portion of the apparatus than the hot gas inlet, a majority of a length of the second conduit may be used for a mixing of the exhaust fluid and the hot gas, for oxidation of the mixture and for a heat transfer to the cool fluid.

By arranging inlets and outlets in top and bottom portions, the cool fluid and the hot gas or the mixture, respectively, essentially have a top-down and bottom-up flow direction. However, also a horizontal or any other tilted flow direction is feasible with the apparatus according to the invention.

An arrangement of inlets and outlets at end portions is not only favorable for a counter-flow application as described above. Also co-flow or cross-flow arrangements may be preferred depending on the application. For example in a co-flow arrangement, hot gas and cool fluid essentially run parallel. Accordingly, in a co-flow arrangement a temperature of a heat conductive element between hot gas and cool fluid is rather uniform. This may be favorable to enable chemical reactions to take place on a large surface with about constant temperature.

The terms 'end portion' and 'opposite end portion', as well as 'top portion' and 'bottom portion' define regions of the apparatus according to the invention, which regions extend over one half (upper half, lower half) of the apparatus and preferably define regions extending over one third of the apparatus (uppermost third, lowermost third) starting at one end or an opposite end (bottom, top) of the apparatus and extend in the direction of the middle of the apparatus. Therein, the apparatus defines a longitudinal axis, which is arranged vertically in a top-bottom arrangement.

According to a further aspect of the apparatus according to the invention, a wall of the second conduit comprises profile structures for supporting a mixing of the exhaust fluid with the hot gas. Profile structures may be used to cause a swirling effect in the second conduit that supports the mixing of the exhaust fluid and the hot gas and therefore may favorably influence the oxidation process of the exhaust fluid.

Profile structures may be surface structures of a wall or parts of a wall of the second conduit. Profile structures may also be profiled walls. Examples of profile structures are a rough surface, dips, indentations, fins or grooves on a surface or stamped wave-like or "chevron" pattern. Profile structures may also enlarge a surface of for example a heat conductive element thus enhancing a heat exchanging.

According to an aspect of the apparatus according to the invention, the apparatus further comprises at least one further heat conductive plate, at least one further side plate and at least one further exhaust fluid inlet. The at least one further heat conductive plate and the at least one further side plate are arranged in an alternating manner and form at least one further first gap and at least one further second gap in between the side plates and the at least one further heat conductive plate. At least one further second conduit is formed by the at least one further second gap. More than one further openings for introducing the exhaust fluid into the at least one further second conduit are arranged within the maximum longitudinal extension for a heat exchanging process and at substantially a same longitudinal position with respect to the second conduit. The arrangement thereby forms a multiple-stack of heat exchanging and fluid mixing apparatuses.

The plate arrangement of the apparatus according to the invention allows for an easy extension of the apparatus to form a multiple-stack of heat exchanging and fluid mixing apparatuses arranged in parallel. Thereby, the same elements are stacked next to each other such that heat exchanging plates and side plates are arranged in alternating order. Also the gaps comprising the respective conduits are arranged in alternating order. By this a very compact arrangement of a plurality of combined mixers and heat exchangers may be manufactures. In multiple-stack apparatuses corresponding inlets and outlets are preferably joined in respective collectors or manifolds. For example in a multiple-stack having a plurality of N hot gas outlets, the N hot gas outlets are joined in one collector only. This simplifies the connection of an apparatus according to the invention to other devices.

While the apparatus according to the invention may be manufactured in a cost efficient manner, this cost efficiency is even more perceivable if a multiple-stack of apparatuses according to the invention is manufactured. Only two kinds of plates have to be manufactured, which may be formed by pressing or cutting. Also same further separating elements may be used. Only one envelope is required for one apparatus or a multiple-stack of apparatuses combining heat exchanging and fluid mixing, since the fluid mixing is integrated into the heat exchanging. No assembly costs are required for connecting separate fluid mixers to heat exchangers, as the apparatus is manufactured as a single component.

The apparatus according to the invention is favourably used in combination and combined with a or with a plurality of fuel cells. Examples for such fuel cells are solid oxide fuel cells (SOFC), alkali fuel cells (AFC), molten carbon fuel cells (MCFC) and phosphoric acid fuel cells (PAFC). This combination is described by a solid oxide fuel cell (SOFC), as one exemplary type of fuel cells. SOFCs are favorable for catalytic energy conversion due to their high efficiency. Since they operate at high temperatures (500-1000 degree Celsius), no previous reforming of fuel gases containing carbon to get hydrogen is necessary before the fuel gas may be used in the fuel cell. However, the oxidant, in general air or oxygen, needs to be preheated before being supplied to the SOFC. Heat from the hot depleted air leaving the SOFC may further be used in the apparatus according to the invention with its heat exchanging function and cool fluid heated up in the apparatus according to the invention may directly be used as preheated air for the SOFC. In addition, the fuel remaining in the depleted fuel leaving the SOFC may also be used by connecting a depleted fuel outlet of the SOFC to the exhaust fluid inlet.

Accordingly, the respective inlets and outlets of the SOFC may be connected to the respective inlets and outlets of the apparatus according to the invention. Therein, the cool fluid outlet of the first conduit is connected to an air inlet of the solid oxide fuel cell and an air outlet of the solid oxide fuel cell is connected to the hot gas inlet of the second conduit. A depleted fuel outlet of the solid oxide fuel cell is connected to the exhaust fluid inlet. A cool fluid inlet and a hot gas outlet of the apparatus according to the invention may not be connected to another device or apparatus, but left open to the environment.

Especially in applications where the apparatus according to the invention is connected with a device that has to reach a certain operation temperature above ambient temperature, for example a fuel cell operating at elevated temperatures, an exhaust fluid may also be a fuel that is not depleted. The reaction heat produced by for example oxidizing the fuel is exchanged with the cool fluid, which is heated up fast due to the higher energy density of fuel compared to depleted fuel. In conventional applications special start burners, for example gas burners or electric burners, are used to preheat a hot gas from 20 to about 800 degrees Celsius, which hot gas may then be introduced into the heat exchanger. In combination with the apparatus according to the invention, a small amount of (non-depleted) fuel may be used at the start of an operation, such that start burners may be omitted, may have a simpler construction (less power required) or that regular start burners may be used for a reduced service time, for example for only a few minutes to preheat hot gas to a temperature of about 200 degrees Celsius only.

BRIEF DESCRIPTION OF FIGURES

In the following embodiments of the apparatus according to the invention are shown by means of the enclosed drawings, wherein:

FIGS. 2,3,4 show further views of the embodiment of FIG. 1 with collectors at inlets and outlets, wherein FIG. 2 is a front view through a plate stack as in FIG. 1, FIG. 3 is a longitudinal cut side view along lines A-A, and FIG. 4 is an enlarged view of detail B of FIG. 3;

FIG. 5 is a sketch of another embodiment of the apparatus;

FIG. 6 is a cross sectional view of the embodiment of FIG. 5;

DETAILED DESCRIPTION

Figure 1:
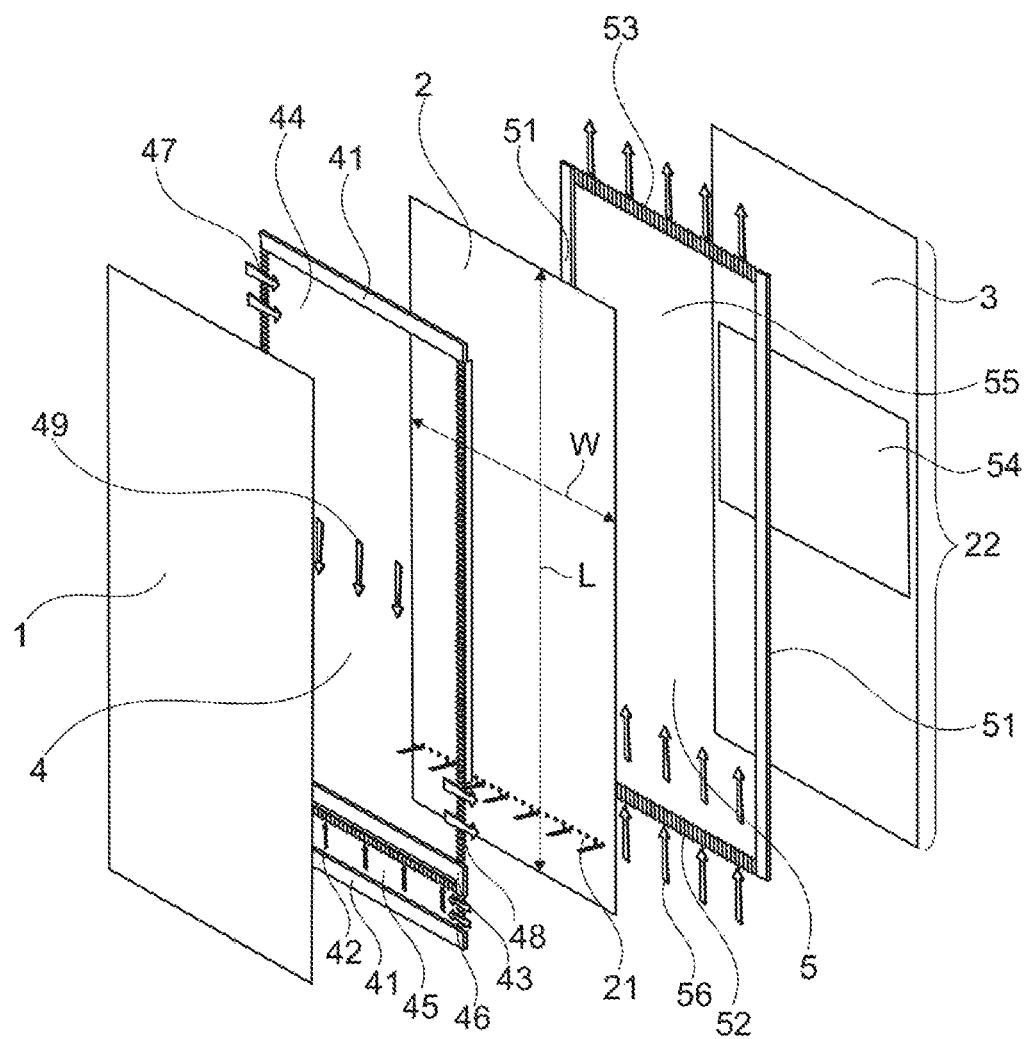
FIG. 1 shows an exploded view of an embodiment of the apparatus.

In FIG. 1 an embodiment of a plate heat exchanger and fluid mixer is shown. Three plates 1,2,3 are arranged next to each other in a face to face manner. The plates are distanced by spacers 41,42,43,51 forming gaps 4,5 in between the plates 1,2,3. A first gap 4 is formed between the first plate 1 and the second (middle) plate 2 and a second gap 5 is formed between the second plate 2 and the third plate. Second gap 5 forms a second conduit 55 provided for guiding a hot gas (the flow direction of the hot gas is indicated by dark arrows 56), for example hot air, through second conduit 55. First gap 4 is divided by a spacer 43 into an upper section and a lower section. The upper section of the first gap 4 forms a first conduit 44 provided for guiding a cool fluid (the flow direction of the cool fluid is indicated by long light arrows 49), for example cool air, through the first gap 4. The second plate 2 is a heat conductive plate comprising or made of a heat conductive material for transferring heat from the hot gas guided in the second conduit 55 to the cool fluid guided in the first conduit 44. The length L of the heat conductive plate 2 defines a maximum longitudinal extension 22 for a heat exchanging process in the apparatus. This arrangement works as a heat exchanger.

The lower section of the first gap 4 forms a third conduit 45. The spacer 43 separating the third conduit is preferably horizontally arranged and extends over the whole width W of the heat conductive plate 2. This spacer 43 is arranged such as to preferably form a gas-tight and fluid-tight separation between first and third conduit 44, 45. The third conduit 45 is provided for guiding an exhaust fluid (the flow direction of the exhaust fluid is indicated by small arrows 42), for example an exhaust gas or a depleted fuel.

The heat conductive plate 2 is provided with a plurality of openings 21, for example a line of perforations. This line preferably extends along the length of the third conduit 45, which corresponds to the width W of the heat conductive plate 2. The openings 21 are arranged in a row at a same longitudinal position of the embodiment of FIG. 1. This corresponds to the same longitudinal position of the second conduit 55 such that exhaust gas 42 is introduced into the second conduit 55 at a same longitudinal position or—due to the second conduit being a straight conduit,—a length of the second conduit 55 measured from a hot gas inlet 52. Injected exhaust gas 42 reaches the region which is cooled by the cool fluid and the catalytically active section 54 at substantially the same time after injection, independent of which opening 21 the exhaust gas 42 is injected. By this, a controlled injection of exhaust gas into the hot gas of the second conduit 55 may be provided. The openings 21 are preferably evenly distributed across the width W, support an even and thorough mixing of the exhaust fluid with the hot gas, which further supports a controlled chemical reaction and heat exchange in the apparatus according to the invention.

The exhaust fluid enters the third conduit 45 by an exhaust fluid inlet 46 arranged in the bottom portion of the apparatus and in a front side of the first gap 4 (with respect to FIG. 1). The exhaust fluid leaves the third conduit 45 through the plurality of openings 21 in the heat conductive plate 2 and enters the second conduit 55. The exhaust fluid mixes with the hot gas flowing in the second conduit (this mixing is indicated by the dark arrows 56 turning to light arrows). The hot gas enters the second conduit 55 by a hot gas inlet 52 and flows to the top side of the apparatus to the hot gas outlet 53. The hot gas—now cooled—and any reaction products as there may be, for example water, carbon dioxide etc., leave the second conduit 55 by the hot gas outlet 53.

The hot gas inlet 52 is arranged in the bottom side of the apparatus and essentially extends over the whole width of the bottom side. The hot gas outlet 53 is arranged in the top side of the apparatus and essentially extends over the whole width of the top side.

The exhaust fluid inlet 46 and the plurality of openings 21 are arranged in the bottom portion of the apparatus. By this the mixing of exhaust fluid with hot gas starts at one end portion of the apparatus and the exhaust fluid/hot gas mixture is guided along most of the length of the second conduit 55. Therein, most of the surface of the heat exchanging plate 2 may be used for a heat exchange from hot gas to cool fluid via heat exchanging plate and most time that the mixture spends in the second conduit 5 may be used for a chemical reaction, preferably an exothermic chemical reaction such as an oxidizing process.

In order to ensure that an exhaust fluid is oxidized, for example if the temperature of the hot gas is not sufficient to start or maintain an oxidizing reaction, the second conduit 55 is provided with a catalytically active section 54, for example a catalytically active coating on the surface of the third plate 3. This catalytically active section 54 is arranged downstream (with respect to the flow direction of the hot gas) of the plurality of openings 21. Preferably, the catalytically active section 54 extends over a middle portion of the second conduit 55, such as to allow for a thorough mixing and still make use of the reaction heat produced by the oxidizing reaction of the exhaust fluid in the heat exchanging process.

The cool fluid enters the first conduit 4 by a cool fluid inlet 47 arranged in a top portion of the apparatus and in a rear side of the first gap 4 (with respect to FIG. 1). The cool fluid is heated up during its flowing through the first conduit 44 by the heat provided by the heat conductive plate 2, which is heated up by the hot gas guided in the second conduit 55 on the other side of the heat conductive plate 2. The cool fluid,—which is named cool fluid before entering and after leaving the heat exchanging and fluid mixing apparatus for simplicity reasons—is heated for example to a few hundred degrees Celsius. It leaves the first conduit 44 by a cool fluid outlet 48 arranged in the bottom portion and in the front side of the apparatus (with respect to FIG. 1). This heated cool fluid may further be used, for example as heat source in air-conditioning or—as in preferred embodiments—as a preheated air source for a fuel cell.

An upstream end of the catalytically active element 54 may directly correspond to a most downstream longitudinal position of the first conduit 44. By this, a reaction in the second conduit 55 is controlled by its initiation or further support at a specific longitudinal position in the apparatus. In addition, the reaction heat is directly led away by the cool fluid in the first conduit. That is, no excessive heat is produced in the second conduit, which is not led away directly and also in a controlled manner.

Figure 4:
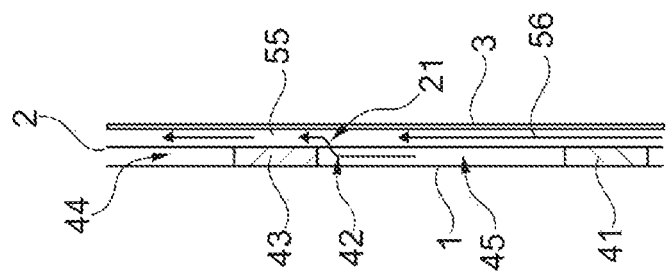
Figure 3:
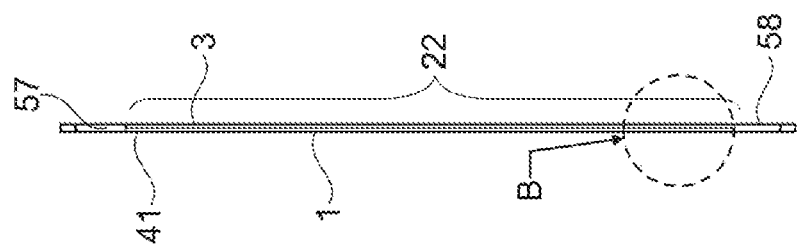
Figure 2:
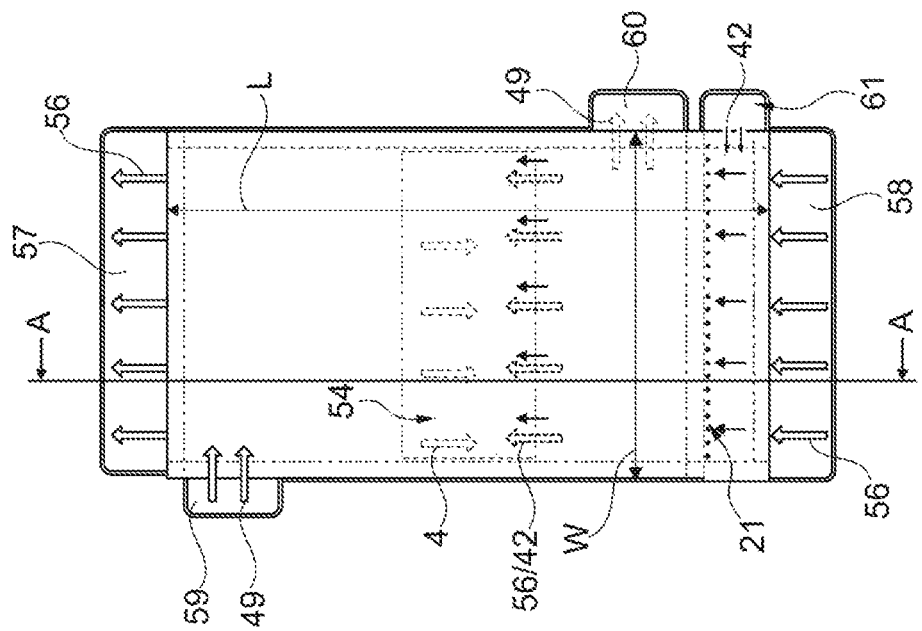

In FIGS. 2 to 4 the apparatus of FIG. 1 in a mounted state including collectors 47-61 at the inlets and outlets is shown. Same reference numbers as in FIG. 1 are used for the same or similar features.

In FIG. 1 and FIG. 2 all inlets and outlets are arranged within the maximum longitudinal extension 22 for a heat exchange (hot gas inlet and outlet are arranged at the outermost end of the extension 22). In FIGS. 2 and 3 a hot gas inlet collector 58 and hot gas outlet collector 57 is arranged adjacent the maximum longitudinal extension 22 with respect to the longitudinal direction of the apparatus, for example upstream or downstream of the extension 22 with respect to the hot gas flow. Such collectors are favourably used for an apparatus built as multiple-stack. For example an apparatus according to the invention having a plurality N of second conduits 55 also comprises a plurality of N hot gas outlets 53. However, the plurality of N hot gas outlets 53 is brought together at the one hot gas outlet collector 57. The same may equally be adapted to the hot gas inlets 52, cool fluid inlets 47 and cool fluid outlets 48, as well as exhaust fluid inlets 46. Therein, the number N of the plurality of second conduits, a number M of a plurality of first conduits and a number L of a plurality of third conduits may be equal or differ from each other.

The through view of the apparatus in FIG. 2 shows the flows of the individual fluids. The hot gas—indicated by dark arrows 56—enters the apparatus at the hot gas inlet collector 58 arranged over the whole bottom side of the apparatus and slightly outside or upstream of the maximum longitudinal extension 22, flows upwardly and leaves the apparatus at the hot gas outlet collector 57, which is also arranged over the whole top side of the apparatus and slightly outside or downstream of the maximum longitudinal extension 22. The cool fluid—indicated by light arrows 49 enters the apparatus at the cool fluid inlet collector 59, which is arranged in the top portion of the apparatus on one side of the apparatus (left side in FIG. 2) just below the hot gas outlet collector 57 and within the maximum longitudinal extension 22. A spacer 41 closes off the first conduit 44 versus the top of the apparatus. The cool fluid flows downwardly and leaves the apparatus at the cool fluid outlet collector 60 arranged on the opposite side of the apparatus (right side in FIG. 2) in the bottom portion of the apparatus and within the maximum longitudinal extension 22. The cool fluid outlet collector 60 is arranged above and distanced from the exhaust fluid inlet collector 61 by the distance of spacer 43. The exhaust fluid inlet collector 61 is arranged on the same side of the apparatus (right side in FIG. 2) as the cool fluid outlet collector 60 and within the maximum longitudinal extension 22, but might also be arranged in the bottom portion but on the side of the cool fluid inlet collector 59.

As shown in FIG. 4, which is an enlarged view of detail B of FIG. 3, which itself is a cross section along line A-A of FIG. 2—shown for a single stack only for the sake of clarity—, the exhaust fluid flows in the third conduit 45 formed between the first plate 1 and the heat conductive plate 2 and upper and lower spacers 43,41. The exhaust fluid passes through the plurality of openings 21, which are arranged in one line and at a same longitudinal position or length in the heat conductive plate. The exhaust fluid then enters the second conduit 55, mixes with the hot gas and passes the catalytically active section 54. Oxidation products leave the apparatus together with the hot gas through the hot gas outlet 53 or hot gas outlet collector 57, respectively.

Guiding the exhaust fluid on the side of the cool fluid is favourable because the flow of hot gas in the second conduit remains undisturbed. Since hot gas generally has a very low density, obstructions in the flow path may cause an unwanted pressure drop over the hot gas conduit.

The inlets and outlets of the conduits end in collectors and are realized in this embodiment as interfaces extending upwardly and outwardly of the basically rectangular plates 1,2,3 that form the heat exchanger body. Such interfaces simplify the connection to corresponding inlets and outlets of for example an energy converter such as a fuel cell or other devices the apparatus according to the invention may be connected to.

In FIGS. 5 and 6 another embodiment of the apparatus according to the invention is shown, wherein the third conduit 45' is arranged in the second conduit 55' guiding the hot gas. The apparatus is arranged in a horizontal position, such that a cool fluid/hot gas flow for the heat exchanging process occurs in a counter-flow left-right/right-left direction along a length of the rectangular plates. Again, same reference numbers are used for same or similar features. Broad dark arrows 56 indicate hot gas flow, narrow dark arrows 49 indicate cool fluid flow and small arrows 42 indicate exhaust fluid flow.

In this embodiment a heat exchanging process from the hot gas to the cool fluid through contact with the heat conductive plate 2' takes place over the maximum longitudinal extension 22. It takes place over the whole length L of the heat conductive plate since hot gas inlet and outlet 52,53 with corresponding collectors 58,57, as well as cool fluid inlet and outlet 47,48 with corresponding collectors 60',59 are arranged at the ends of the maximum longitudinal extension 22.

The exhaust fluid inlet collector 61' or the at least one exhaust fluid inlet 46, is arranged near mid-length of the apparatus or near half the length L of the heat conductive plate 2'. The third conduit 45' is integrated into the second conduit (seen in FIG. 6) and extends over the width of second conduit 55' and the width W of the heat conductive plate 2'. The third conduit 45' is arranged perpendicular to the second conduit 55' and extends over about half the width of the second gap 5 between the heat conductive plate 2' and the second side plate 3. In the other half of the width of the second gap the hot gas flows past the third conduit 45'. The third conduit 45' is provided with a plurality of openings 21' along the length of the third conduit, arranged on a downstream side with respect to the second conduit and at a same longitudinal position. By this exhaust fluid in the third conduit may leave the third conduit and enter the hot gas in the second conduit 55' at several locations across the width of the second conduit. The third conduit forms an obstacle in the path of the hot gas and causes the hot gas and the exhaust fluid to swirl, which additionally supports the mixing of the two fluids. For optimizing a pressure drop in the second conduit, the third conduit may also be limited in length, i.e. not extend over the whole width W of the second conduit. Hot gas in the second conduit then bypasses the injection and mixing area.

Since no exhaust fluid needs to pass through the heat conductive plate 2', no openings are provided therein.

The cool fluid outlet 48 and cool fluid outlet collector 59 is arranged at one end (right side in FIG. 5) of the apparatus. Thereby, the length of the first conduit 44', where cool fluid is guided in, is enlarged to the whole length of the heat conductive plate 2', enhancing the efficiency of the heat exchanging process.

Arranging the third conduit in the second conduit guiding the hot gas in a more central position of the second conduit allows the arrangement of an injection and mixing of exhaust fluid in a position of the apparatus with lower temperature than at the hot gas inlet. If temperatures at the hot gas inlet are very high, rapid oxidation of the exhaust fluid may already occur at the hot walls of the second conduit, thus further raising the temperatures. By arranging the third conduit further downstream of the hot gas inlet an oxidation temperature may be chosen and adapted to a corresponding application of the apparatus according to the invention. Especially, the apparatus according to the invention may be used in more extreme conditions, such as higher initial temperatures of the hot gas.

It can be seen, that an exhaust fluid inlet may also be arranged in the second conduit at the same longitudinal position than the hot gas inlet at the one end of the heat conductive plate 2', i.e. at the one end of the maximum longitudinal extension 22. In such an arrangement, the more than one openings for introducing the exhaust fluid into the second conduit may be identical to the exhaust fluid inlet.

In FIG. 6 the apparatus is shown as multiple-stack. A further heat conducting plate 200 and a further side plate 300 is stacked on top of the stack of plates 2',3 (lowermost side plate 1 not shown) of a basic stack for example as shown in FIG. 1. Corresponding further first and second gaps are formed. A further third conduit 450' provided with openings 21' is arranged in the further third conduit 45'.

Also the apparatus as shown in FIGS. 1 to 3 may be extended to a multiple stack of heat exchanging and fluid mixing apparatuses. Therein further heat exchanging plates having openings are provided and further spacers are arranged in respective locations.

Figure 7:
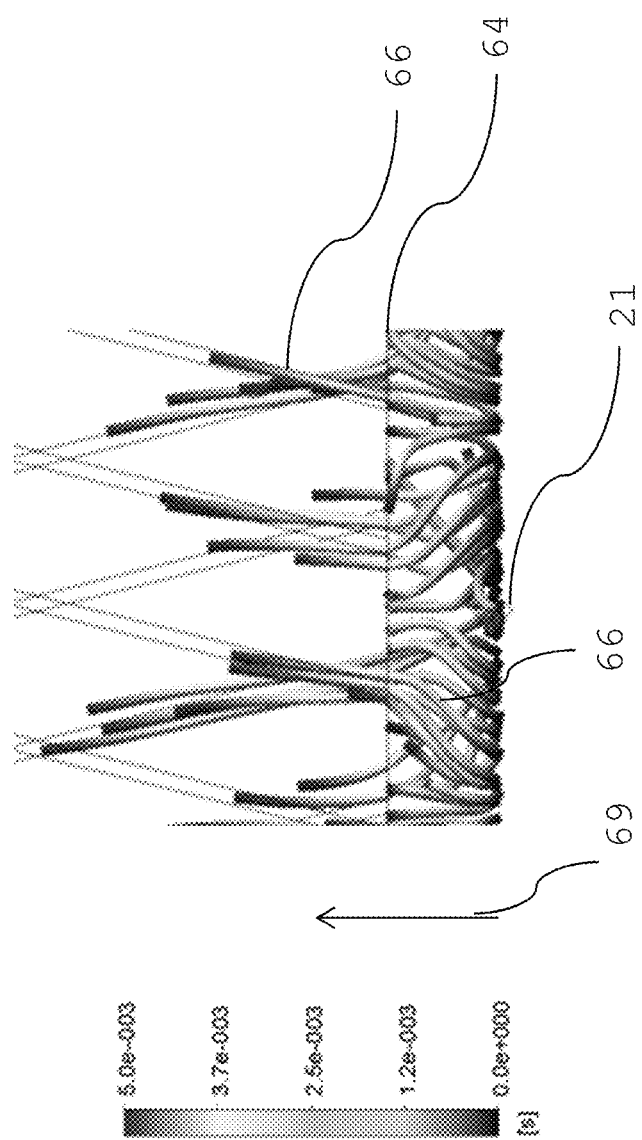
FIG. 7 shows a simulation of a fluid introduced into hot gas through a row of openings in a heat exchanging plate.

In FIG. 7 a simulation of a fluid introduced into hot gas through openings 21 in a heat exchanging element, preferably a plate, is shown. The simulation shows the example of an anode gas containing hydrogen and other components such as CO, CO2 and water. The anode gas is introduced into a cathode gas, which is at a temperature of 700 degree Celsius. The cathode gas contains oxygen, N2 and water. The water is provided in the form of steam or vapour. At these temperatures and at a given concentration of hydrogen and oxygen used for the simulation, ignition of the gas mixture starts after 5 ms after introduction of the anode gas into the cathode gas. In the figure, streamlines 66 representing the gas flow are depicted in grey shades, which shades change from the point of injection 21 with time (dark at injection 21; dark after 5 ms). The streamlines 66 end after 5 ms after injection. Depending on the kind of spreading of the gas flow after its injection and turbulences, a flow advances further downstream into the apparatus as is indicated by the different lengths of streamlines 66. A flow direction is indicated by arrow 69.

Line 64 indicates the arrangement of the cool conduit at a location downstream of the openings 21 and on the opposite side of the heat exchanging element than the cathode gas. That is, line 64 indicates the section of the apparatus, where the hot cathode gas now mixed with the anode gas starts to get cooled via the heat exchanging element. Accordingly, the position of the cool conduit may be chosen such as to be optimized on the temperature and other parameters of the reaction to be performed in the apparatus. In the present example, the cool conduit is arranged such as to correspond to a distance that the introduced flow reaches at or preferably after 5 ms after injection of the anode gas. By this no combustion occurs without cooling. Preferably line 64 also indicates the upstream end of a catalytically active coating in the hot conduit. The catalytically active coating is arranged preferably such that ignition only starts at the catalytically active heat exchanger region.

It can be seen in FIG. 7 that most streamlines 66 reach line 64 when or shortly before 5 ms have passed after the time of injection. At this moment the gas reaches the section, where the gas is cooled by the cooling fluid. At the same time the gas would start combusting, which combustion reaction is additionally supported or induced by the catalytically active coating that starts in this area. However, due to the cooling action, the chemical process becomes rather a quite oxidation reaction than a combustion. By this, excessive heat caused by the oxidation reaction is used and led away in the heat exchanger. No uncontrolled reaction occurs that might possibly damage the apparatus. The coating additionally supports the controlled combustion of the gas mixture.

The invention has been described with reference to the embodiments shown in the drawings. However, it is obvious to a person skilled in the art that many variations, modifications or changes are possible without departing from the scope of the invention. By way of example only, the arrangement of inlets and outlets may vary. For example the inlets, outlets and collectors may be arranged differently, also for example perpendicular to side plates. Also, the manner how the conduits are embodied may be different from the conduits actually shown in the drawings. All such variations, modifications or changes are intended to be within the scope of the invention which is defined by the appended claims.

The invention claimed is:

1. A combined heat exchanging and fluid mixing apparatus comprising:
   a first conduit for guiding a cool fluid through the first conduit, the first conduit comprising a cool fluid inlet and a cool fluid outlet, wherein the cool fluid comprises a temperature;
   a second conduit for guiding a hot gas through the second conduit, the second conduit comprising a hot gas inlet and a hot gas outlet, wherein the hot gas has a temperature of between 500 and 1000 degrees Celsius and a temperature of the cool fluid is lower than the hot gas temperature;
   a heat conductive element arranged between the first conduit and the second conduit for transferring heat from the hot gas to the cool fluid, the heat conductive element having a length defining a maximum longitudinal extension for a heat exchanging process in the combined heat exchanging and fluid mixing apparatus, the combined heat exchanging and fluid mixing apparatus further comprising:
   a third conduit for guiding an exhaust fluid, the third conduit comprising an exhaust fluid inlet arranged at one end of the third conduit for introducing the exhaust fluid into the combined heat exchanging and fluid mixing apparatus for mixing of the exhaust fluid with the hot gas and for a chemical reaction of an exhaust fluid/hot gas mixture in the second conduit, wherein the third conduit comprises more than one openings for passing the exhaust fluid from the third conduit into the second conduit,
   wherein the more than one openings for introducing the exhaust fluid into the second conduit are arranged within a maximum longitudinal extension for a heat exchanging process in the combined heat exchanging and fluid mixing apparatus, and wherein the more than one openings are arranged at substantially a same longitudinal position with respect to the second conduit, wherein the more than one openings are arranged along a length of the third conduit, and wherein the third conduit is arranged on a same side of the heat conductive element as the first conduit and the more than one openings are arranged in the heat conductive element.

2. The combined heat exchanging and fluid mixing apparatus according to claim 1, wherein the exhaust fluid inlet is arranged within the maximum longitudinal extension for a heat exchanging process in the combined heat exchanging and fluid mixing apparatus.

3. The combined heat exchanging and fluid mixing apparatus according to claim 1, wherein the more than one openings are arranged downstream of the hot gas inlet.

4. The combined heat exchanging and fluid mixing apparatus according to claim 1, wherein the third conduit is arranged in a second direction perpendicular to a direction of the first or second conduit.

5. The combined heat exchanging and fluid mixing apparatus according to claim 1, wherein a fluid-tight separation element is arranged between the first conduit and the third conduit for a fluid-tight separation of the first conduit and the third conduit.

6. The combined heat exchanging and fluid mixing apparatus according to claim 1, wherein the heat conductive element is a heat conductive plate arranged between a first and a second side plate, the heat conductive plate and the first and second side plates being arranged at a distance to each other forming a first gap between the first side plate and the heat conductive plate and forming a second gap between the heat conductive plate and the second side plate, wherein the first gap is separated into the first conduit and into the third conduit, wherein the second conduit is formed by the second gap, and wherein the more than one openings is arranged in the heat conductive plate.

7. The combined heat exchanging and fluid mixing apparatus according to claim 1, wherein the second conduit comprises a catalytically active element for further chemical reaction.

8. The combined heat exchanging and fluid mixing apparatus according to claim 1, wherein a catalytically active element is adapted for oxidation of the exhaust fluid/hot gas mixture.

9. The combined heat exchanging and fluid mixing apparatus according to claim 1, wherein the cool fluid inlet and the hot gas outlet are arranged at one end portion of the combined heat exchanging and fluid mixing apparatus; and the cool fluid outlet, the hot gas inlet, the exhaust fluid inlet and the more than one openings are arranged at an opposite end portion of the combined heat exchanging and fluid mixing apparatus.

10. The combined heat exchanging and fluid mixing apparatus according to claim 1, wherein a wall of the second conduit comprises profile structures for supporting a mixing of the exhaust fluid with the hot gas.

11. The combined heat exchanging and fluid mixing apparatus of claim 7, wherein an upstream end of the catalytically active element is arranged at a position which corresponds to a downstream position of the first conduit.

12. The combined heat exchanging and fluid mixing apparatus of claim 6, further comprising:
   at least one additional heat conductive plate;
   at least one additional side plate, the at least one additional heat conductive plate and the at least one additional side plate being arranged in an alternating manner and forming at least one additional first gap and at least one additional second gap in between the at least one additional side plate and the at least one additional heat conductive plate, at least one additional second conduit being formed by the at least one additional second gap;
   at least one additional exhaust fluid inlet; and
   more than one additional openings for introducing the exhaust fluid into the at least one additional second conduit, the more than one additional openings being arranged within the maximum longitudinal extension for a heat exchanging process and at the same longitudinal position with respect to the second conduit, thereby forming a multiple-stack of heat exchanging and fluid mixing apparatuses.

* * * * *